Oct. 12, 1943.   W. E. URSCHEL   2,331,520
BEET HARVESTER
Filed Feb. 6, 1941   4 Sheets-Sheet 1

INVENTOR.
William E. Urschel
BY
ATTORNEY.

Oct. 12, 1943.  W. E. URSCHEL  2,331,520
BEET HARVESTER
Filed Feb. 6, 1941  4 Sheets-Sheet 2

INVENTOR.
William E. Urschel
BY
ATTORNEY.

Oct. 12, 1943. W. E. URSCHEL 2,331,520
BEET HARVESTER
Filed Feb. 6, 1941 4 Sheets-Sheet 4

INVENTOR.
William E. Urschel
BY
ATTORNEY.

Patented Oct. 12, 1943

2,331,520

UNITED STATES PATENT OFFICE 2,331,520

BEET HARVESTER

William E. Urschel, Valparaiso, Ind.

Application February 6, 1941, Serial No. 377,639

20 Claims. (Cl. 55—108)

This invention relates to a machine advanceable across a field for harvesting an in-ground crop having an above-ground foliage appendage, and while the machine embodiment herein shown is especially adapted for harvesting sugar beets, the underlying principles of the invention are not so restricted.

Generally, the present invention is based upon structure constituting an improvement over the beet harvester machines disclosed in my United States Letters Patents Nos. 1,894,802 and 1,964,896, and of which each includes a dirigible running gear carrying a plow-like lifter member for penetrating the earth beneath the crop to lift the same, puller frames upon which there are endless puller chains having opposed rearwardly and upwardly directed flights cooperable to grippingly engage the foliage of the lifted crop and thus carry such crop against and between roller bar units that operate to divert the crop through a course wherein the upper part thereof is conducted into predetermined relation with cutters for separating the crop from the foliage. The machine disclosed in said Patent No. 1,964,896 also has a conveyor system onto which the crop, severed from its top or foliage, is deposited for transmittal to a windrow or into an accompanying receiver.

The objects of this invention include the provision of:

An improved plow-like lifter member readily maintained substantially uniformly at a selected depth, and attachable to the machine frame in a manner to clear a space for the puller chains so they are less inclined to the earth's surface.

A new frame structure wherein there is attaching means for a draw bar and associated means for the attachment of the aforesaid lifter.

New guard wheels upon the undersides of the puller frames at their front lower end portions to facilitate elevation of such ends over irregularly upwardly projecting crop articles during operation of the machine.

Novel differential support means for puller chain guide rollers, functioning to equalize the pressure of these rollers against the working or pulling flight of the associated chain.

An improved and simplified puller chain driving gear train that permits separation and relative pivotal adjustment of the puller chains without disturbing the driving connection with those chains.

An improved piovtally mounted sub-frame assembly wherein the upper ends of the puller chain frames, the roller bars and the cutters are all supported, whereby the front ends of said puller chain frames are adjustable vertically in accordance with the earth and crop profile incident to pivoting the sub-frame without varying the position of the pulled crop with respect to any of said assembly parts.

An improved and simplified roller bar driving gear train that permits independent pivotal and lateral adjustment of the roller bar units while maintaining an effective driving connection.

A foliage discharge apparatus including blades operable with a sweeping motion backwardly over the roller bars to remove the severed foliage therefrom, and a blower having a receiving section disposed for admitting the thus removed foliage.

A new conveyor structure that provides, below the cutters, a low receiving section for the crop after severance from the foliage, the structure being such that said section is sufficiently low for the cutters and roller bars and the upper ends of the puller chains to be substantially lower with respect to the corresponding parts in said Patent No. 1,964,896 wherein a conveyor is incorporated. This arrangement, together with my improved lifter mount referred to above makes it practically possible to decrease the intersection angle formed between the puller chains and the roller bars and correspondingly lessen the change in the course of the crop as it is transferred from said chains to said bars and thus minimize the damage to the foliage and likelihood of it breaking to frustrate the operation.

A conveyor structure as the above wherein the low receiving section is provided on its under side with a plate turned upwardly at its forward edge to effect a skid suitable to absorb shock incurred by encounter with irregular ground surface sections and to exclude dirt or debris from the conveyer.

A novel cleaner device associated with the conveyor to turbulate and pommel the crop as an expedient for separating dirt therefrom.

A new puller chain in which the links have flanges engageable with the sides of toothless idler rollers to retain the chain upon these rollers.

Other desirable objects encompassed by and inherent to this invention will later become apparent.

The machine will now be described with reference to the drawings and to facilitate an understanding of the machine together with its operation, the description will be divided into several sections respectively relating to sub-combinational parts of the machine.

*The frame structure*

Figures 1, 2, 3:
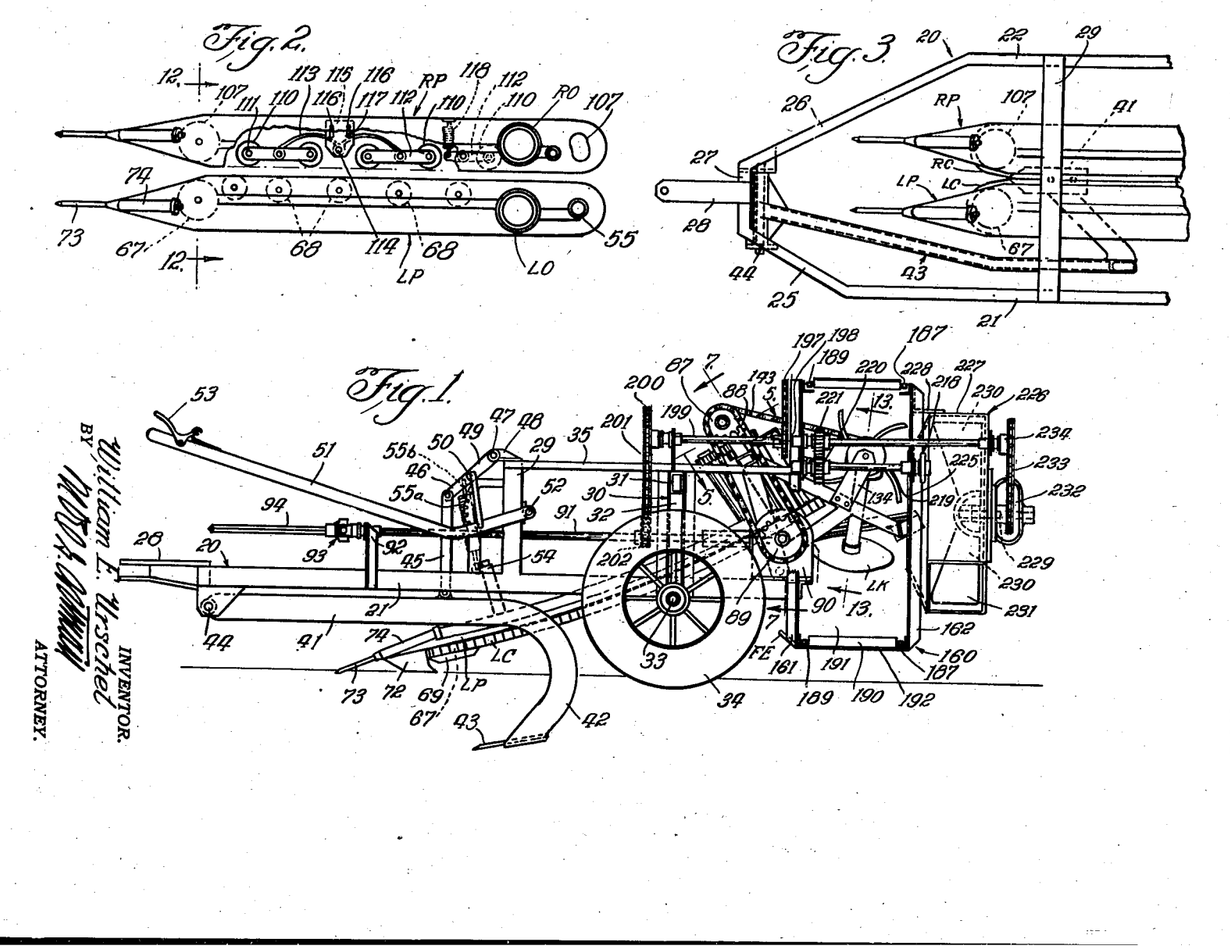
Fig. 1 is a side elevational view of a harvesting machine embodying a preferred form of the invention.
Fig. 2 is a plan view of the puller mechanism comprising a part of the machine shown in Fig. 1, parts of one of the puller frame members being broken away to disclose the mounting for pressure rollers for the working flight of a puller chain.
Fig. 3 is a fragmentary plan view of the forward part of the machine.
Figures 4, 5, 6:
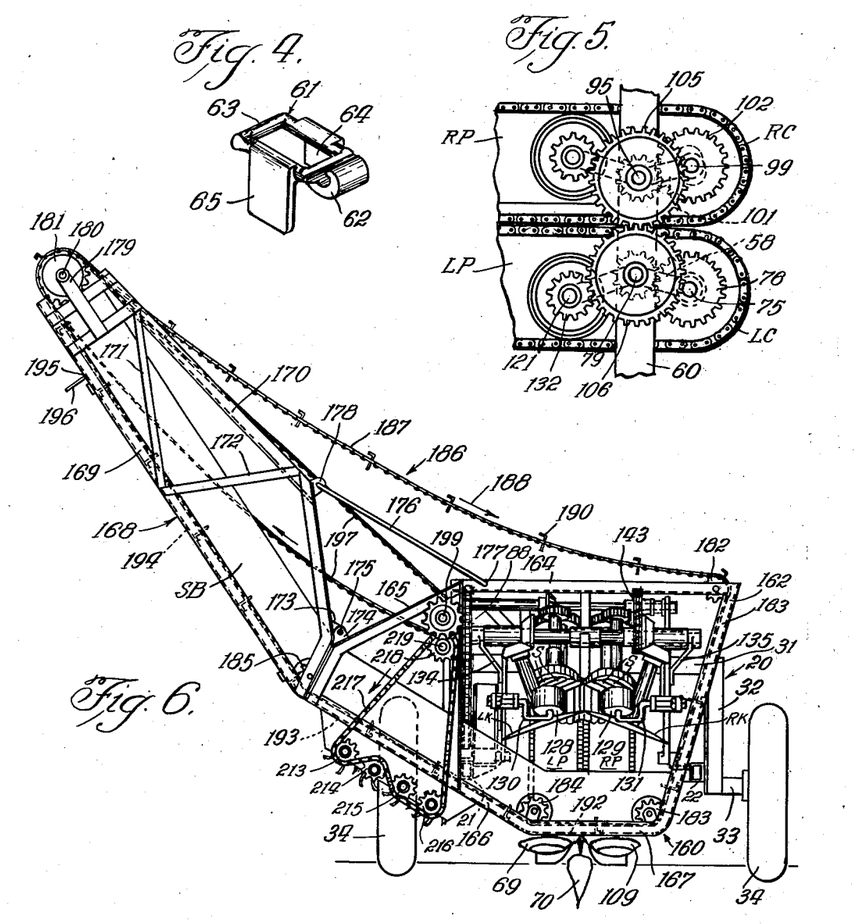
Fig. 4 is a perspective of a puller chain link.
Fig. 5 is a fragmentary plan view illustrating driving mechanism for the puller chains and roller bar units included in the machine, and taken on the line 5—5 of Fig. 1.
Fig. 6 is a rear elevational view of the machine.

The main frame which comprises a part of the machine running gear is clearly illustrated in Figs. 1, 3, 6 and 7. This frame, generally designated 20, is fabricated from hollow steel members that are rectangular in transverse section as can be seen in Fig. 6 where the back ends of side rail members 21 and 22 are visible. The back or main body portions of said side rail members are arranged in parallelism as shown in Figs. 1 and 3 and have inwardly directed forward portions 25 and 26 which are joined at their ends with a short cross piece 27, preferably by a welded connection. This forward part of the frame carries a clevis 28 for coupling the machine with a draw bar as of a tractor. Said side members 21 and 22 are connected by an inverted U-shaped transverse member 29, and also by means of a more rearwardly disposed transverse frame member 30 comprising a spanning beam 31 having vertical legs 32 at opposite of its ends and respectively joined with the side members 21 and 22. Stub axle shafts 33 are secured to the lower ends of the legs 32 for carrying support wheels 34; see Fig. 6. Additional frame members 35 of which one is shown in Fig. 1 are connected between the U-shaped transverse member 29 and the transverse member 30 to strengthen the frame, and a portion of said members 35 project backwardly for cooperating with the rear ends of the side rails 21 and 22 in supporting crop elevator and foliage blower mechanism later to be described.

Figure 7:
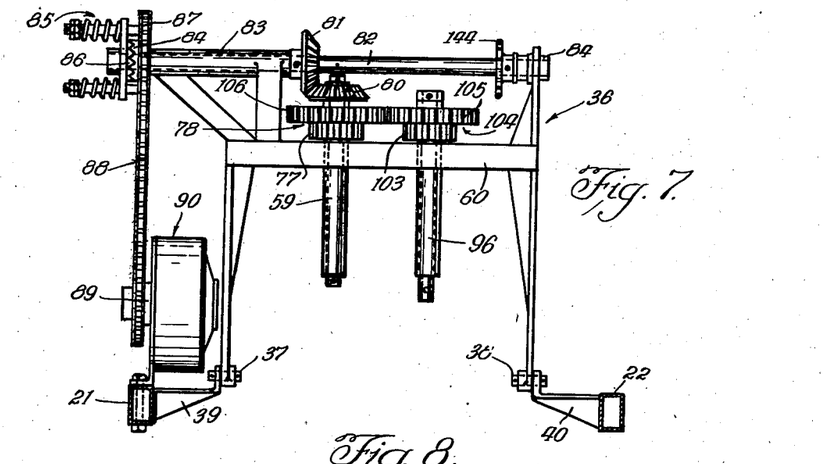
Fig. 7 is a view looking forwardly substantially upon the line 7—7 of Fig. 1, illustrating a sub-frame pivotally connected with the principal frame of the machine and also illustrating parts of the shafting and gearing for driving the puller chains and roller bar units.

In Figs. 6 and 7 there is shown a sub-frame 36 pivotally carried upon pins 37 and 38 which are anchored within brackets 39 and 40 respectively attached to and projecting inwardly from the side rail members 21 and 22. The frame 36 is for supporting the upper ends of the crop puller mechanism, roller bar units, cutters and foliage ejecting mechanism as well as driving mechanism for all of these parts subsequently to be described.

Both the frame 20 and the sub-frame 36 include various members as brackets in which there are bearings for rotatable shafting and the like, and where it is apparent how these bearings are supported they will simply be referred to as journaled upon the frame or sub-frame as the case may be without specific reference to the bracket or other part in which the bearing is formed or supported.

*The crop lifter*

As explained hereinabove the present machine includes a plow or lifter of which a part is advanced with the machine below the ground level and beneath the embedded crop for lifting the same so that the stress placed upon the crop foliage by puller chains, presently to be described, will be lessened to avoid any likelihood of premature separation of the crop from its foliage.

Referring again to Figs. 1 and 3 the lifter will be seen to consist of a substantially horizontal beam 41 having at its back end a spur section 42 turned laterally downwardly and forwardly in support of a forwardly directed shovel member 43. The beam 41 is pivotally connected at its forward end with a pin 44 carried in the draw bar connecting end of the frame 20. This horizontal beam is offset laterally at its back end with respect to puller frames LP and RP in which the aforesaid puller chains are disposed, and clearance for these puller frames, which are to move upon opposite sides of crop row, is provided in the immediate vicinity of the ground level by curving the spur section 42 laterally downwardly and inwardly into the desired position for the shovel 43. By employing a lifter beam of this character, the force applied by the soil upon the shovel 43 while the machine is traversing a field is such as to tend to maintain said shovel at an average suitable depth with respect to the ground surface. Furthermore, this form of lifter provides for its connection with the frame 20 at the section for attachment of a draw bar so that no other part of the frame need be designed with special strength for withstanding the drag load of the lifter member, which, in certain instances will be substantial, as in harvesting sugar beets when the shovel 43 will be set at comparatively great depth.

Means for adjusting the depth at which the crop lifter shall be maintained comprises a vertical link 45 which at its upper end is pivotally connected with the forward end of an arm 46. Said arm is fixed upon a cross shaft 47 that is journalled in a plurality of bearing members 48 attached to the U-shaped frame member 29 and of which one is shown in Fig. 1. A second arm, 49, fixed to the shaft 47 is connected by means of a link 50 with an operating lever 51, the latter being pivotally connected with the machine frame through a pin 52. An operator while in the driver's seat of a tractor (not shown) may grasp the end of the lever 51 together with a conventional finger grip 53 for releasing the lever 51 from a cooperating segment (not shown) and then pivot said lever 51 for changing the elevation of the lifter shovel 43. While, for example, the lever 51 is being pivoted clockwise, the link 50 will cause the arm 49, the shaft 47 and the arm 46 to pivot clockwise whereby the link 45 elevates the shovel 43 while pivoting the beam 41 about the pin 44. Movement of the lever 51 counterclockwise will cause the shovel 43 to be lowered. When the desired depth of the shovel is obtained, the finger grip 53 will be released whereby said lever 51 and hence the lifter member 41 will be locked in that position. And since the natural tendency for the lifter 41 is to maintain the shovel 43 in average depth position, the force exerted by the soil upon the lifter member tending to displace said member from a selected position to the natural position will be small, wherefore the stress required of the control linkage connected with the lever 51 for holding the lifter in the selected position will be small.

The crop puller mechanism

The puller mechanism comprises right and left puller frames designated RP and LP supported at their upper ends upon the sub-frame 36 in a fashion presently explained and which project downwardly and forwardly as shown in Fig. 1. Said puller frames are suspended at their lower ends by an inverted U-shaped resilient strap-like member 54. This U-shaped member yieldingly resists separation of said frame members, and in turn is supported by a helical spring 55a which depends from a free end of an arm 55b, shown in part in dotted outline in Fig. 1, having its opposite end fixed to the shaft 47 controlled by the manually operable lever 51. By rotating the lever 51 clockwise the spring 55a, incident to distending, will be caused to exert a lifting force upon the puller frames whereby their lower ends are easily raised by encountered obstructions as crop articles or soil protuberances. Extreme clockwise rotation of the control lever 51 will cause the lower ends of said frame members to be lifted entirely clear of the ground into a transporting position.

Figures 10, 11, 12, 13:
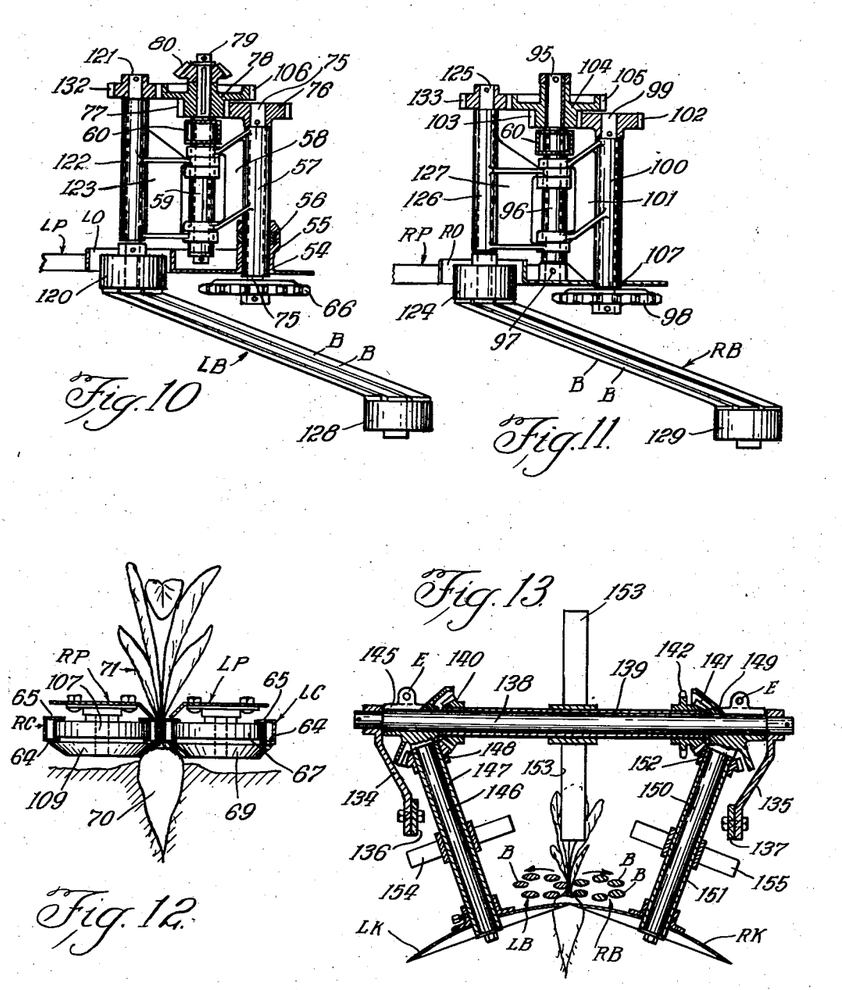
Fig. 10 is a side elevational view of the driving mechanism for the left puller chain and for the left roller bar unit, the view being taken from the left.
Fig. 11 is similar to Fig. 10 but showing the driving mechanism for the right puller chain and for the right roller bar unit.
Fig. 12 is a transverse sectional view taken on the line 12—12 of Fig. 2.
Fig. 13 is a transverse sectional view taken through the cutter mechanism and the foliage ejecting mechanism at the plane indicated by the line 13—13 in Fig. 1.

The upper end of the left-hand puller frame LP, Figs. 2 and 10, has an opening surrounded by an upwardly directed flange 55 of which a circumferential section is cut away to receive a bearing collar 56. Said collar and flange are slid upwardly onto a bearing sleeve 57 carried upon a bracket 58 which is pivotally connected with a bearing sleeve 59 that depends from a cross piece 60 of the sub-frame 36; see Figs. 7 and 10. A set-screw (not shown) is employed for holding the collar 56 in place upon the bearing sleeve 57 whereby the flange 55 is kept from sliding endwise from said sleeve but is adapted to pivot thereabout so the front end of the puller frame LP may be pivotally adjusted laterally with respect to the puller frame RP.

A puller chain LC associated with the puller frame LP consists of a plurality of chain links 61 as that shown in Fig. 4 and which comprises upon one end a hook 62 which is connectible with an opposite end section 63 of each adjacent link. These links are connected into an endless chain in such a manner that the flanges 64 and 65 thereof are turned inwardly as shown in Fig. 12 with the shorter flange 64 lowermost. The chain LC is carried upon a driving sprocket 66 at the upper end of the puller frame LP, Fig. 10, and rides about an idler wheel 67, Figs. 2, 3 and 12, journalled in the lower end. A plurality of idler rollers 68, Fig. 2, journalled in the puller frame member LP are arranged with their peripheries in engagement with the chain LC along its working flight which during operation of the machine is moved upwardly and backwardly. The width or vertical dimension of these rollers 68, like the roller 67, Fig. 12, is sufficiently short to permit the roller to extend outwardly between the inwardly turned flanges 64 and 65 upon the chain links. Thus the link flanges 64 and 65 prevent the chain moving axially with respect to the rollers or to become dislodged therefrom even though the chain is comparatively loose.

In Figs. 1 and 12 the idler roller 67 at the lower end of the puller frame LP will be seen to have an inverted frusto-conical guide 69 in association with it to engage crop articles as 70, which project upwardly above the surface of the field, and cause the lower end of the puller frame to be elevated for passing over the top of such article whereby the working flight of the puller chain is placed in the proper position with respect to the crop foliage 71. The puller frame LP has a skid shoe 72 for sliding along the surface of the field to support (with the assistance of the spring 55a) the lower end of said puller frame member and to normally assure that the guide roller 69 will be slightly above the field surface so that said guide member may more readily engage and slide over the top of upwardly projecting crop articles. There is also associated with the lower end of the puller frame LP a foliage gathering finger 73 retractable against the urge of a spring (not shown) into a spring chamber 74. The normal operation of the finger 73 is to pass beneath and raise prostrate foliage leaves from the soil surface and cause the same to be slid upwardly onto the puller frame so that such leaves will be above the puller chain when the latter reaches the crop. Should an unyieldable object be struck by the end of the finger 73 it will simply be forced backwardly into the spring chamber 74 without injury.

The power train for driving the puller chain LC comprises the aforesaid drive sprocket 66, Fig. 10, a shaft 75 to which the sprocket 66 is secured and which is journalled in the bearing sleeve 57, a gear 76 fixed to the upper end of said shaft 75, gear 77 of a compound gear member 78, a shaft 79 journalled in the sleeve 59 and keyed to said compound gear member 78, a bevel gear 80 keyed to said shaft 79, a mating bevel gear 81, Fig. 7, a cross shaft 82 fixed to the gear 81 and journalled in sub-frame bearings 83 and 84, the driven member 84 of a yieldable clutch member 85, the driving member 86 of said clutch, a sprocket 87 journalled upon said shaft 82, a chain 88, a sprocket 89 which is driven through a speed reducer unit generally designated 90, a drive shaft 91, Fig. 1, which is journalled at its forward end within a bearing member 92 suitably secured to the machine frame, a universal joint 93 and a propeller shaft 94 driven as from the engine of a tractor used for propelling the machine.

Since the bracket 58, Fig. 10, including the bearing sleeve 57 is journalled upon the sleeve 59 coaxially with the gear 77, said sleeve 57 may be displaced circumferentially about the sleeve 59 without disturbing the driving connection between the gears 76 and 77. Consequently any lateral thrust applied to the puller chain LC as by an unyieldable object accidentally caught between the upper ends of the puller chain working flights would result in the upper end of the puller frame LP being moved laterally, together with the sleeve 57 with which it is connected, without causing injury to any of the parts and without affecting the above described driving connection for the puller chain.

The upper end of the puller frame RP, Fig. 10, is connected with the lower end of a shaft 95 which is journalled within a bearing sleeve 96 depending from the cross member 60 of the sub-frame 36, a pin 97 establishing the connection. The puller chain RC for the right puller frame is driven by a sprocket 98, fixed to the lower end of a shaft 99 journalled within a bearing sleeve 100 upon a bracket 101 that is pivotally associated with the outer periphery of the bearing sleeve 96. The upper end of the shaft 99 is driven through a gear 102 which meshes with a gear 103 of a compound gear member 104 which is freely rotatable about the shaft 95. A gear 105 of the rotatable member 104 meshes with and is driven by a gear 106, Figs. 7 and 10, which is a part of the compound gear member 78. Hence the greater part of the power train for driving the sprocket 98 consists of that above described for driving the sprocket 66 associated with the puller chain LC.

The puller chain RC is made up of chain links 61, Fig. 4, similarly to the puller chain LC and is driven from the sprocket 98 about an idler roller 107, Figs. 2 and 3, which corresponds to the idler roller 67. In Fig. 12 the flanges 64 and 65 of the chain links in the chain RC will be seen to be associated with the idler roller 107 in the same manner that those flanges of the links in the puller chain LC are associated with the idler 67. Also the puller frame RP is provided with a frusto-conical guide wheel 109 connected for rotation with the idler wheel 107 in the same manner that the guide wheel 69 is connected for rotation with the idler 67. These two guide wheels 109 and 69 cooperate in lifting the lower ends of the puller frames over a crop article as illustrated in Fig. 12.

A plurality of idlers 110 associated with the puller frame RP and for bearing outwardly against the inner side of the working flight upon the puller chain RC are arranged in staggered relation with respect to idler rollers 68. Said rollers 110, with the exception of the uppermost thereof, are arranged in pairs of which the individual rollers are journalled about vertical pins as 111 at opposite ends of equalizer arms 112 and these arms are pivotally supported at the ends of leaf spring members 113 which are suitably anchored at 114 upon a laterally adjustable plate 115. Thus the rollers 110 are yieldingly pressed outwardly against their associated puller chain and their force is differentially applied to such chain because of the pivotal connection of the arms 112 with the ends of the spring 113. The amount of pressure exerted by the rollers 110 may be regulated by loosening bolts 116 passing through slots 117 in the plate 115 and thereafter sliding the plate laterally to obtain the desired pressure and thereafter tightening said bolts to maintain the adjustment. In the case of the uppermost roller 110, the arm 112 carries no cooperative roller but is connected by a contraction spring 118 with a side of the puller frame so that said roller 110 is yieldingly urged outwardly against the puller chain. This yieldable mounting of the idlers 110 causes automatic adjustment of the space between the puller chains to accommodate crop foliages of varying thickness.

Since the bracket 101 is pivotally connected with the sleeve 96 co-axially of the gear 103, the bearing sleeve 100 and the sprocket 98 may be displaced laterally to permit a non-compressible object to pass between the puller chains while the gear 102 merely planets slightly about said gear 103 without impairing or disrupting the driving connection for the puller chain RC. Likewise, the puller frame RP may be separated from the puller frame LP at its lower end against the urge of the resilient U-shaped bracket 54 incident to causing the shaft 95, Figs. 5 and 11, to pivot within the bearing sleeve 96. Thus a hard foreign object entering between the lower ends of the puller chains could cause separation of these chains and of the puller frames without injuring the apparatus. In Fig. 2, an opening 107 in the puller frame RP and for receiving the lower end of the bearing sleeve 100, Fig. 11, will be seen to be oversize with respect to such sleeve to permit such pivotal movement of the puller frame RP about the axis in the shaft 95.

The roller bars

The roller bars for transferring the crop from the puller chains and carrying the crop into predetermined relation with respect to a cutter mechanism comprising cutter disks LK and RK, Figs. 1 and 13, will now be described with reference to Figs. 1, 6, 10, 11 and 13. These roller bars, individually designated B, are incorporated into a pair of complemental sets or units LB and RB. The exact shape of these roller bars and their mode of operation is disclosed in my aforesaid Patent No. 1,894,802. However, it will be explained that the roller bars in the unit LB are journalled at their front ends in vertical bearings spaced equidistantly outwardly from the center of a driving head 120 that is fixed upon the lower end of a shaft 121 journalled in a bearing sleeve 122 of a bracket 123 which is rotatively attached to the bearing sleeve 59, Fig. 10; whereas the roller bars in the unit RB are similarly journalled at their front ends within bearings of a driving head 124 fixed upon the lower end of a shaft 125 journalled within a bearing sleeve 126 of a bracket 127 pivotally supported upon the bearing sleeve 96 in Fig. 11. The lower ends of the roller bars in the unit LB have downwardly turned bearing portions journalled within vertical bearings distributed at equal radial distances from the center of a rotatable supporting head 128, and the lower ends of the roller bars in the unit RB are similarly formed and journalled within a supporting head 129. The supporting heads 128 and 129 are fixed upon brackets 130 and 131, Fig. 6, which are attached to the pivotally mounted sub-frame 36. The driving heads 120 and 124 are supported in registry with large openings LO and RO in the puller frames LP and RP and both the upper and lower ends of the roller bars are angularly bent as shown with respect to the lower end sections S in Fig. 6 whereby the straight intermediate sections of these bars in each unit are adapted to be carried successively into juxtaposed meshed relation with the corresponding sections of the bars in the other unit when the driving heads 120 and 124 are rotated.

The driving head 120 is driven clockwise, as viewed from above, through the shaft 121 and by a gear 132 which meshes with the gear 106, the latter being driven by the power train described in the above part of this description under the sub-title The crop puller mechanism. The gear 105 in Fig. 11 is also driven by said power train and drives a gear 133 which is fixed to the shaft 125 for causing counter-clockwise rotation of the driving head 124 as viewed from above. Such clockwise rotation of the driving head 120 and counter-clockwise rotation of the driving head 124 imparts an elliptical orbital movement to the parallel straight sections of the roller bars B as indicated by the arrows in Fig. 13, the lower ends of said roller bars then causing rotation of the supporting heads 128 and 129. As each crop article is moved upwardly and backwardly relatively to the machine between the opposed working flights of the puller chains LC and RC, a section of the crop foliage will be carried between the roller bar units whereupon the orbital moving straight sections of the roller bars will engage such section of the foliage as illustrated in Fig. 13 and convey the crop article backwardly while maintaining the article in abutting relation with the bars moving upwardly into mesh. These bars, in addition to conducting the crop rearwardly, continually regrip the foliage between successively cooperative bars for impositively pulling upwardly upon the foliage whereby a crop article which had been embedded deeply in the soil and therefore had been engaged high upon its foliage by the puller chains, and correspondingly high by the bars, will be lifted by such bars to bring the upper portion of the crop article into close association therewith. Hence it will be seen that the roller bars will cause every crop article to reach the cutter disks LK and RK in such a position that a predetermined amount of the crop adjacently to the foliage will be removed by the cutter mechanism.

Since the brackets 123 and 127, Figs. 10 and 11, are supported coaxially with the gears 106 and 105 which through the gears 132 and 133 drive the driving heads 120 and 124, said heads may be separated slightly without disturbing the driving connection while merely displacing the gears 132 and 133 orbitally with respect to their driving gears 106 and 105. Therefore, if an unyieldable object should accidentally become lodged between the cooperative straight sections of the roller bar units LB and RB, these units would simply separate incident to spreading the driving heads 102 and 124. The openings in the puller frames LP and RP for said driving heads are sufficiently oversize to accommodate this lateral movement thereof.

*The cutter and foliage ejecting mechanisms*

Since the cutter mechanism and the foliage ejecting mechanism are so closely associated they will be described in this same division of the specification. These two mechanisms are supported upon arms 134 and 135 which are secured to backwardly extending members 136 and 137, Fig. 13, of the sub-frame 36 which is shown somewhat isolated in Fig. 7. A cross shaft 138 is carried non-rotatively within the upper ends of the arms 134 and 135 and has journalled thereon a sleeve 139 having bevel gears 140 and 141 secured upon its two ends. The bevel gear 141 has an associated sprocket 142 which is driven through a chain 143, Figs. 1 and 6, from a sprocket 144, Fig. 7, upon the shaft 82, the latter being driven by the power train described in the previous section titled The Crop Puller Mechanism.

Upon the left end of the cross shaft 138 there is a gear guard member 145 having a depending shaft 146 upon which there is journalled a sleeve 147 having a driving connection with the gear 140 through a bevel gear 148. The lower end of the sleeve 147 carries the cutter disk LK. A similar construction upon the right end of the cross shaft 138 consists of a gear guard member 149 from which there depends a shaft 150, a sleeve 151 rotatively upon said shaft 150, the cutter disk RK, and a bevel gear 152 driven from the gear 141 for rotating the sleeve 151 and the cutter disk RK.

Pivotal adjustment may be had of the disks LK and RK about the shaft 138 for changing the setting of said disks relatively to the roller bars to determine the amount cut from the foliage end of the crop. This is accomplished by loosening bolts (not shown) in paired apertured ears E upon opposite sides of the slits in axial split bearing portions of the guard members 145 and 149 and tightening these bolts for drawing the paired ears together for clamping said bearing portions upon the shaft after the adjustment has been made.

The foliage ejecting mechanism consists of a plurality of prodding members in the form of blades as the blades 153 upon the sleeve 139 and the blades 154 and 155 respectively upon the sleeves 147 and 151. During operation of the machine while the sprocket 142 is rotated counter-clockwise as viewed from its left end, it will be seen that the cutters LK and RK will be respectively rotated clockwise and counter-clockwise as viewed from above while the ejector blades 153, 154 and 155 will be rotated respectively in the directions of said sprocket and the cutter members LK and RK for ejecting the severed foliage backwardly beyond the ends of the roller bars into a blower mechanism subsequently described.

*The crop elevator*

When the crop is severed by the knives LK and RK it will fall into the receiving section 191 of a crop elevator mechanism for carrying the crop upwardly and laterally with respect to the machine and discharging the same into an accompanying receiver such as the box of a wagon or truck. The elevator mechanism comprises a frame 160 of which a lower portion comprises a pair of similarly shaped front and back frame members 161 and 162. The shape of these frame members 161 and 162 is determinable by examing the member 162 in Fig. 6, it being a closed configuration of straight sides respectively designated 163, 164, 165, 166 and 167, constructed of any desirable number of angle iron pieces or the like. Suitable cross members (not shown) reaching from front to back interconnect the frame members 161 and 162, and said frame member 161 is fixed upon the back ends of the main frame side rails 21 and 22 and of the backwardly extending frame members 35; see Fig. 1. A frame extension 168 is detachably connected with and extends upwardly from the left side of the frame members 161 and 162. This frame extension comprises four longitudinal corner members as 169 and 170 braced by diagonal reinforcing bars as 171 and 172. A pair of ears 173 upon the inner end of the extension 168 overlap mating ears 174 upon the left sides of the frame members 161 and 162, and pins 175 disposed mutually within apertures within these ears provide a connecting means between the lower frame portion and the extension 168. Additional connecting means is provided by rods as 176 attached to the lower frame portion at respective apertured sections as 177 and connected at their opposite ends with apertured ears as 178 upon the frame extension. These rods 176 and the pins 175 are easily removed when it is desired to disassociate the extension 168 from the lower frame portion to render the machine more easily transportable.

A pair of bearing straps 179 respectively upon the front and back sides of the frame extension, one being shown in Fig. 6, carry a shaft 180 having sprockets 181 fixed thereon adjacently to each of its ends. The conveyor frame also carries conveyor guide means in the form of sprockets 182, 183, 184 and 185 in lateral alignment with the back sprocket 181, and sprockets respectively coaxial with said sprockets 182, 183, 184 and 185 disposed adjacently to the front side of such frame and in lateral alignment with the frontmost of the sprockets 181.

A conveyor belt 186 is made up of a back chain 187 rotated in the direction indicated by the arrow 188 in Fig. 6 about the sprockets 181, 182, 183, 184 and 185, and a front chain 189, Fig. 1, which is similarly carried upon the sprockets arranged coaxially with the just recited sprockets. There are a plurality of angle iron cross bars 190 carried by and between the chains 187 and 189 so that when said belt is rotated these cross bars will engage the crop, as it drops from the cutters LK and RK into the receiving section 191 onto a bottom plate 192, and push the crop upwardly along a second bottom plate 193 and along a third bottom plate 194 in the detachable part of the conveyor frame. Sideboards SB cooperate with the bottom plates as 194 to retain the crop in the conveyor. The upper end of said bottom plate 194 terminates at 195 where its edge is turned downwardly as a flange 196. Consequently, when the crop is advanced beyond the edge 195 it will spill outwardly across the flange 196 into a suitable receiver (not shown).

The power train for driving the conveyor belt comprises a sprocket (not shown) on the forward end of the shaft 180, a chain 197, a sprocket 198, Fig. 1, for said chain, a shaft 199 upon which said sprocket is fixed, a sprocket 200 fixed to said shaft, a chain 201 and a sprocket 202 connected with the drive shaft 91.

In Fig. 1 the conveyor bottom plate 192 is shown turned upwardly at its forward edge FE, this plate being made sufficiently heavy to serve as a skid for engaging and sliding over earth protuberances and said upturned edge guiding the same onto the protuberances and preventing the scooping of the dirt into the conveyor receiving section 191.

The dirt removing apparatus

Figure 8:
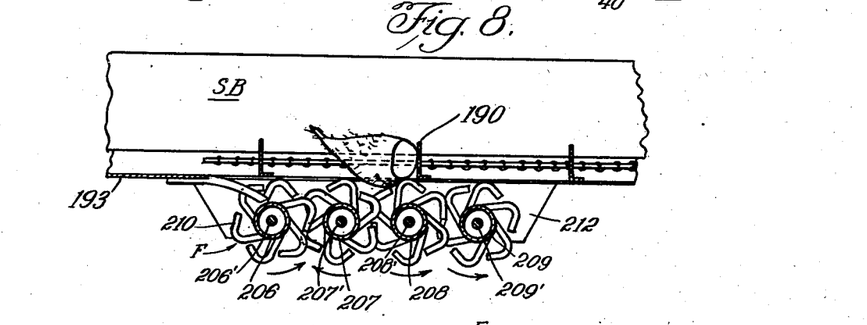
Fig. 8 is a fragmentary sectional view taken through a portion of the elevator mechanism and dirt cleaner apparatus associated therewith, the view being taken on the line 8—8 of Fig. 9.
Figure 9:
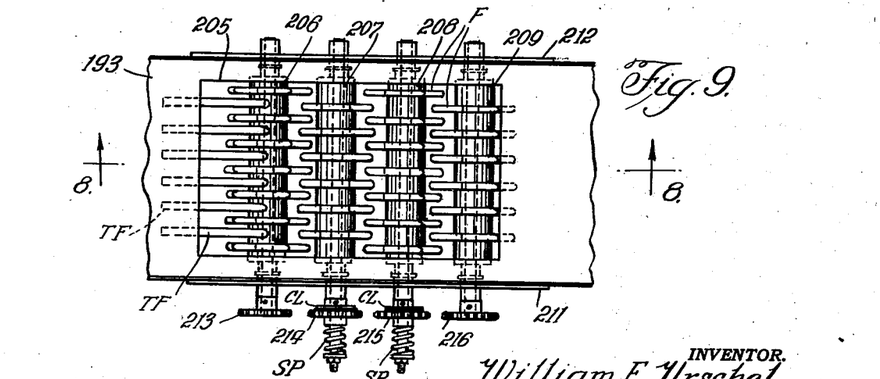
Fig. 9 is a plan view of the apparatus shown in Fig. 8.

There is shown in association with the conveyor mechanism an apparatus for tumbling the crop to dislodge and divert any loose soil that may be clinging thereto. Such dirt removing apparatus is illustrated in Figs. 6, 8 and 9.

Here the conveyor bottom plate 193 is shown provided with an opening 205 beneath which there is a plurality of rollers 206, 207, 208 and 209, each having a plurality of fingers F having turned-over end sections 210. These fingers are arranged in sets that are spaced axially of their respective rollers as 206 and the sets of the adjacent rollers are arranged in overlapping staggered relation as can be seen in Fig. 9. Said rollers are fixed upon shafts 206', 207', 208' and 209' journalled within suitable bearings carried in downwardly projecting plates 211 and 212 and at such an elevation that the most radially outward portions of the fingers F will reach upwardly to a plane substantially flush with the bottom plate opening 205. These fingers F together with transfer strips TF effect a bed across which the crop can be pushed by the conveyor belt. Sprockets 213, 214, 215 and 216, drivingly connected respectively with the shafts 206' to 209', are driven by a chain 217 which is laced about these sprockets in the fashion illustrated in Fig. 6. An upward portion of the chain 217 meshes with the teeth of a driving sprocket 218 fixed to a shaft 219, Figs. 6 and 1, which is driven from the shaft 199 through gears 220 and 221. The chain 217 is driven in the direction indicated by the arrow in Fig. 6 to cause rotation of the rollers 206 to 209 in the direction indicated by the arrows in Fig. 8.

As the crop is conveyed over the rotating fingers F it will be pommeled and tumbled for dislodging dirt which will fall through the opening 205 and between the rollers as 206 onto the ground. The fingers have their sections 210 so turned that their ends trail with respect to the circumferential movement of these fingers and therefore avoid hooking onto plant stems or other debris which may accidently find its way into the conveyor. Such debris, like the dislodged soil, will be discharged from the conveyor through the opening 205 and between said rollers.

It will be noted that the fingers F on the roller 206, while disposed between said roller 206 and the roller 207, are moving upwardly as are the fingers on the roller 208 while disposed between said roller and the roller 209. Such movement of the fingers on the rollers 206 and 208 will prevent any crop articles being drawn downwardly between the rollers 206 and 207 and between the rollers 208 and 209. However, the fingers upon the rollers 207 and 208, while between these two rollers, are moving downwardly so that a slender portion of a crop article therebetween would be pulled downwardly. But passage of an article between the rollers 207 and 208, or permanent wedging thereof between these rollers, is prevented by the use of impositive drive means in the form of friction clutches CL which effect the driving connection between the sprockets 214 and 215 and their shafts 207' and 208', helical springs SP determining the pressure between the driving and driven parts of these clutches and hence the load capacity thereof. This load capacity is so regulated that the clutches will slip and no longer rotate the rollers 207 and 208 in the event of a crop article becoming lodged between their fingers until such article is dislodged by the succeeding cross bar 190 of the conveyor belt. By arranging the sets of fingers in staggered relation and the rollers sufficiently close together for the fingers upon each roller to project into close proximity with each adjacent roller, the collection and winding of fibrous debris about these rollers to a degree that would impair operation of the dirt removing apparatus is precluded.

The foliage blower apparatus

As the foliage is pushed backwardly from the roller bars by the foliage ejecting apparatus this foliage passes through an opening 225 in the front wall of a drum-like blower casing 226 having a generally cylindrical side wall 227. This casing is secured to the back end of the conveyor frame 160 by brackets as 228. A fan comprising a shaft 229 journalled in the rear wall of the casing 226 and blades 230 upon said shaft inside said casing rotates the foliage circumferentially about the casing wall 227. These fan blades also draw air into the casing through said opening 225 and with sufficient force to expedite the transfer of the foliage and other debris into the casing 226 and this air together with the foliage is discharged tangentially through an opening 231 into a windrow as the machine is advanced, or, into a receiver, if desired. Driving means for the shaft 229 consists of a sprocket wheel 232 secured thereto, a chain 233 and a sprocket 234 upon the shaft 199.

*Summary*

In the operation of the present machine, as it is drawn through a field by tractive force applied to the clevis 28, the puller frames LP and RP will straddle a crop row while the working flights of the conveyor chains LC and RC cooperatively grip the crop foliage and pull upwardly thereon. Meanwhile the crop is loosened and pushed from the soil by the lifter shovel 43. Driving force for the various parts of the machine, including the puller chains LC and RC, is obtained from an independent power unit through a propeller shaft 94. The crop that has been extracted from the soil is carried upwardly and backwardly with respect to the machine by said puller chains until the foliage reaches the front ends of the roller bars whereupon these bars control the backward course taken by the crop.

In the harvesting of sugar beets it is found that the tops of the crop project various distances above the ground surface. Some of the crop articles will be substantially buried in the ground while others in the same crop row will project a considerable distance above the ground surface, so to enable the puller chains to engage the crop foliage within wide limits of crop projection or state of complete coverage by the soil, the sub-frame 36 carrying the upper ends of the puller frames RP and LP is pivotally connected at the pins 37 and 38 shown in Fig. 7 wherefore the front ends of these puller frames and the puller chains carried thereby are easily changed in elevation. The spring 55a is operable to exert an upward force upon the front ends of the puller frame so that the force of gravity upon these frames is counteracted and less force is required to lift them upwardly. Normally the shoe members 72 secured to the front ends of the puller frames slide along the ground surface to maintain the lower ends of the puller chains at a predetermined distance above the ground surface, but upon the encounter by the guide disks 69 and 109 with a shoulder portion of a higher projecting crop article, these guide disks will readily climb the crop article to dispose the puller chains at the proper elevation for gripping its foliage. Since the shoes 72 insure that the guide disks as 69 will be supported above the earth's surface, these guide disks will always be in an elevated position for engaging the upward part of a crop article in the aforedescribed manner.

Different thicknesses of crop foliage gripped between the puller chains are readily accommodatable, by the pressure rollers 110 associated with the puller frame RP as illustrated in Fig. 2 and which, because of their resilient and differential mountings, enable the puller chains to yieldingly separate for handling comparatively heavy foliage while still being operable for gripping light foliage with adequate force. Greater separation of the puller chains as occasionally required by relatively thick unyieldable objects accidentally wedged therebetween is permitted by the resilient connector strap 54 near the lower ends of the puller frames, whereas similar separation is permitted near the upper ends of the puller frames by the puller chain driving mechanism comprising the gears 76 and 102 supported by the brackets 58 and 101 whereby lateral separation of the puller frames may occur while the gears 76 and 102 are displaced slightly circumferentially about their respective drive gears 77 and 103 without disrupting or impairing the driving connection.

By employing puller chains whose links have spaced flanges 64 and 65, Fig. 4, plain idler rollers as 67, 107 and 110 can be used since these flanges lap over the rollers to retain the chains thereon.

To insure that the crop will be severed uniformly at its upper end, I mount both the roller bar units and the cutter mechanism upon the pivotal sub-frame 36. The roller bar units operate to feed the foliage upwardly to carry the upper ends of the crop articles into abutting relation with the roller bars and simultaneously convey the crop in this abutting relation backwardly past the cutter disks LK and RK into predetermined relation with said cutter disks.

In the prior machines the puller chains extended backwardly sufficiently far with respect to the back ends of the roller bars to discharge the foliage to the rear of these bars. However, in the present structure I avoid such long puller chains by incorporating with the cutter mechanism a foliage ejecting mechanism comprising the blades as 153, and I also provide the blower mechanism which sucks this foliage and other debris into the fan casing 226 for discharging the same at a selectively remote place with respect to the machine.

The conveyor mechanism upon this machine is also an important improvement since it is so constructed and arranged that the receiving section 191 is sufficiently low to enable lowering the position of the sub-frame 36 and the various mechanisms carried thereon, wherefore the intersection angle of the roller bars and the puller chains is minimized so that change in the direction of movement of the crop as it is transferred from the puller chains to the roller bars is less abrupt and causes less injury to the foliage and correspondingly minimizes the likelihood of breaking the foliage and causing frustration of the machine operation. Since some crop articles, notably sugar beets, are sometimes extremely long, the distance between the bottom of the roller bars or cutter mechanism and the receiving section of the conveyor belt is necessarily a certain minimum so there will be sufficient space for the crop articles to be carried into the conveyor receiving section for deposit upon the conveyor belt. In order to arrange said space and the cutter mechanism as low as possible the receiving section of the conveyor mechanism is constructed with a bottom member in the form of a skid so that this bottom member may be carried in such close proximity with the ground that the intercepting of this bottom member with occasional protuberances in the path of the machine will be unharmful since the skid will simply slide over them. The conveyor belt is of the type in which only a single flight is disposed between the conveyor bottom member and the cutter mechanism so that the available space between said cutter mechanism and the conveyor bottom member will not be restricted by a return flight of this belt.

Lowering of the sub-frame and of the crop puller chains is also made possible by the present lifter structure, which, while of the beam type to enable it to operate deeply in the soil, clears space for the movement of the crop backwardly by said chains when the latter are lowered correspondingly with the lowering of the sub-frame in support of their back ends.

While I have herein shown and described a specific embodiment, it should be understood that the invention extends to other arrangements, details and structures falling within the spirit thereof.

I claim:

1. In a machine advanceable across a field to harvest an in-ground crop having an above-ground foliage, and including a frame whereon there is a crop pulling means of which a portion occupies a position substantially at the ground-line for engaging such foliage adjacently to the crop, the combination of lifter means comprising a lifter member disposable below the ground at a point substantially in vertical registry with said portion of the crop pulling means, a beam pivotally connected with a frame portion forwardly of said portion of the crop pulling means and extending backwardly laterally of said lifter member, and a spur portion of said beam disposed laterally outwardly from the entire crop pulling means and directed downwardly and laterally inwardly into connection with said lifter member.

2. In a machine for harvesting an in-ground crop having an above-ground foliage, a longitudinal puller frame having an end section disposable adjacently to the ground surface at a side of such crop, means connecting said puller frame with said machine to permit change in the elevation of said end section, and a rotatable disk-like guide member disposed with its principal axis generally upright and journalled upon the under side of said end section for rotation about such axis, said guide member having upon its under side and adjacently to its rim a radially outwardly and upwardly directed portion abuttable against an unembedded crop to ride thereover incident to lifting said lower end section into improved operating association with the foliage of such unembedded crop.

3. The combination set forth in claim 2, and wherein there is ground engaging means connected with said puller frame to normally support said guide member a predetermined distance above the ground.

4. The combination set forth in claim 2, and wherein there is means for rotating said guide member in the direction to cause the rim section thereof disposed adjacently to the crop to move backwardly with respect to the machine.

5. In a machine of the class described, driving means for the driving head of a roller bar unit, comprising a bearing member, support means upon and oscillatable about said bearing member laterally of said unit, a driven gear journalled in said support means, means establishing a driving connection between said gear and the head of said roller bar unit, and a drive gear meshed with said driven gear, and said driven gear being planetatable about the drive gear incident to such lateral movement of the support means, to maintain the meshed relation of said gears.

6. In a machine for harvesting a foliage-bearing crop, foliage gripping means, cutter means upon a side of said gripping means and operable to sever the crop from its foliage while the latter is held by said gripping means, and foliage ejecting means comprising a rotatable member, a blade-like prodding member upon said rotatable member at the opposite or foliage side of said gripping means, and means for rotating said member to carry said prodding member against the severed foliage to brush the same from said gripping means.

7. In a machine for harvesting a foliage-bearing crop, foliage gripping means, cutter means upon a side of said gripping means and operable to sever the crop from its foliage while the latter is held by said gripping means, and foliage ejecting means comprising a prodding member upon the opposite side of said gripping means and means for moving said member against the severed foliage to brush the same from said gripping means.

8. In a machine for harvesting a foliage-bearing crop, foliage gripping means, drivable cutter means upon a side of said gripping means and operable to sever the crop from its foliage while the latter is held in the gripping means, a rotatable member extending from the opposite side of said gripping means into driving relation with the cutter means, and a blade-like prodding member upon and rotatable with said rotatable member against the severed foliage to knock the same from the gripping means.

9. In a machine for harvesting a foliage-bearing crop, generally horizontal longitudinal foliage gripping means operable to transfer a crop, foliage uppermost, lengthwise thereof, drivable cutter means below the gripping means for severing the crop from the foliage while the latter is held in said gripping means, driving means for said cutter means, comprising rotatable shafting members respectively arranged substantially horizontally above the gripping means and substantially vertically above and upon at least one side of said gripping means, and prodding blades connected with said shafting for orbital movement thereabout and in such position with respect thereto that they are carried lengthwise of the gripping means during a portion of their orbital movement for brushing the severed foliage lengthwise of said gripping means.

10. In a machine of the class described wherein there is means for holding the foliage of an in-ground crop while the crop is severed therefrom; foliage ejecting apparatus comprising a rotatable member adjacently to said holding means, blade means extending radially from said rotatable member in position to sweep the severed foliage from the holding means during rotation of said member at a speed to cause movement of the blade means at a substantial speed relatively to the holding means, and means for rotating said member at said speed.

11. In a machine of the class described, the combination of crop conveying means, mechanism for severing the foliage from an in-ground crop while it is in the conveying means, mechanism including a sweeper movable at a substantial speed relatively to said conveying means for ejecting the severed foliage from the severing mechanism, and blower mechanism comprising a fan casing having a discharge opening and a receiving opening in position to receive the ejected foliage, and a fan in said casing, rotatable to discharge the foliage outwardly from the casing through said discharge opening.

12. In a machine of the class described, the combination of crop conveying means, mechanism for severing the foliage from an in-ground crop while it is in the conveying means, mechanism including a sweeper movable at a substantial speed relatively to said conveying means for ejecting the severed foliage from the severing mechanism, and blower mechanism comprising a receiver having a discharge opening and a receiving opening in position to receive the ejected foliage, and a fan rotatable to create in said receiver an air stream toward and through the discharge opening and of sufficient intensity to carry therewith the foliage in said receiver.

13. In a vehicular harvesting machine, foliage gripping means from which a foliage-bearing root crop can depend while suspended from its foliage, cutter means operable to sever the crop from its foliage while so suspended whereby said crop is permitted to drop, and crop conveyor means comprising a receiver compartment below the cutter means in position to catch the crop as it drops, and said receiver section including a bottom section in the form of a skid adjacently to the ground and adapted to engage and slide over ground protuberances.

14. In a vehicular harvesting machine wherein there is article conveying and depositing means; conveyor mechanism comprising a receiving compartment for articles from said depositing means and low slung wherefore the depositing means can be correspondingly low while still occupying a cooperable position with respect thereto, said receiving compartment including a bottom section forming a skid adjacently to the ground for slidingly engaging ground protuberances to facilitate passage of said compartment thereover during advancement of the machine, and a conveyor belt comprising an article transporting flight movable in contiguity to and across the upper side of said bottom section to convey the articles from said compartment.

15. The combination set forth in claim 14, wherein said bottom section of the article receiving compartment includes an upwardly curved portion at its forward edge with respect to the forward direction for advancement of the machine.

16. In a vehicular harvesting machine, conveyor apparatus comprising a low slung article receiving portion including a bottom section constructed for skidding upon the ground during advance of the machine, a conveyor belt comprising upper and lower flights of which the lower flight is disposed above said bottom section, and guide means supporting said flights sufficiently far apart to accommodate articles therebetween in transporting relation with the lower flight.

17. In a vehicular harvesting machine, conveyor apparatus comprising a low slung article receiving portion including a bottom member of which a portion is in the form of a skid in close proximity with the ground and having an upwardly curved front edge, a lattice conveyor belt comprising upper and lower flights, and guide means for directing the lower flight across the upper face of said bottom member to push received articles therealong and for supporting the upper of said flights at sufficient height to clear such articles.

18. In a vehicular harvesting machine, foliage gripping means for a foliage-bearing crop, cutter means below said gripping means and operable to sever a crop from its foliage held in said gripping means, and conveyor apparatus comprising a receiving portion for the severed crop, including a bottom section below said cutter means to catch the severed crop and in close proximity with the ground, a conveyor belt having upper and lower flights mutually embracing said gripping means and said cutter means, and conveyor guide means for maintaining said flights in such embracing relation and for guiding the lower flight across the upper face of said conveyor bottom section.

19. The combination set forth in claim 18, wherein there is foliage ejecting means above said foliage gripping means and operable to eject the severed foliage transversely of and between the conveyor belt flights.

20. In a vehicular harvesting machine, foliage gripping means for a foliage-bearing crop, cutter means below said gripping means and operable to sever a crop from its foliage held in said gripping means, and conveyor apparatus comprising a crop receiving portion including a bottom member of which a portion is below said cutter means to catch the severed crop and in the form of a skid in close proximity with the ground and having an upwardly curved front edge, a lattice conveyor belt comprising upper and lower flights, and guide means for directing the upper flight over and about the gripping means and the cutter means and for directing the lower flight across the upper face of said bottom member.

WILLIAM E. URSCHEL.